United States Patent
Huang et al.

(10) Patent No.: US 9,628,529 B2
(45) Date of Patent: Apr. 18, 2017

(54) REGION ON INTEREST SELECTION

(71) Applicant: Cisco Technology, Inc., San Jose, CA (US)

(72) Inventors: Haihua Huang, Juangsu (CN); Yuan Wu, Juangsu (CN); Quilan Huang, Juangsu (CN)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 14/461,976

(22) Filed: Aug. 18, 2014

(65) Prior Publication Data

US 2016/0050245 A1 Feb. 18, 2016

(51) Int. Cl.
| | | |
|---|---|---|
| *G06F 3/00* | (2006.01) | |
| *H04L 29/06* | (2006.01) | |
| *H04N 7/14* | (2006.01) | |
| *G06Q 10/10* | (2012.01) | |
| *H04L 12/18* | (2006.01) | |
| *H04M 3/56* | (2006.01) | |
| *H04N 7/15* | (2006.01) | |
| *G06F 3/048* | (2013.01) | |
| *H04L 12/58* | (2006.01) | |

(52) U.S. Cl.
CPC ......... *H04L 65/4084* (2013.01); *G06Q 10/10* (2013.01); *G06Q 10/107* (2013.01); *H04L 12/1813* (2013.01); *H04L 12/1827* (2013.01); *H04M 3/567* (2013.01); *H04N 7/147* (2013.01); *H04N 7/152* (2013.01); *G06F 3/048* (2013.01); *H04L 51/20* (2013.01)

(58) Field of Classification Search
CPC ....................................... G06F 3/048
USPC .......................................... 715/738
See application file for complete search history.

(56) References Cited

U.S. PATENT DOCUMENTS

| | | | |
|---|---|---|---|
| 5,828,913 A * | 10/1998 | Zanen ................... | G01C 11/06 348/E13.007 |
| 8,300,078 B2 | 10/2012 | Lovhaugen et al. | |
| 8,442,043 B2 | 5/2013 | Sharma et al. | |
| 8,531,447 B2 | 9/2013 | Walker et al. | |
| 9,131,105 B2 * | 9/2015 | Bansal ..................... | H04N 7/15 |
| 9,241,111 B1 * | 1/2016 | Baldwin ................ | G03B 35/08 |
| 9,245,288 B1 * | 1/2016 | Lee .................. | H04L 29/06476 |
| 2005/0062844 A1 * | 3/2005 | Ferren ..................... | H04N 7/15 348/14.08 |

(Continued)

OTHER PUBLICATIONS

Aditya Mavlankar et al., Video Streaming with Interactive Pan/Tilt/Zoom, Oct. 2009, High-Quality Visual Experience.

(Continued)

*Primary Examiner* — William Titcomb
(74) *Attorney, Agent, or Firm* — Lempia Summerfield Katz LLC

(57) ABSTRACT

In one implementation, a presentation includes multiple regions of interest or multiple views. The presentation is viewed by local users at the same location as the presentation and remote users at locations different from the presentation. A device receives orientation data from one or more local users that indicates the viewing angle of the one or more local users. The device selects a view including one of plurality of regions of interest based on the orientation data and sends a media stream including the view to the one or more remote users.

19 Claims, 11 Drawing Sheets

(56) References Cited

U.S. PATENT DOCUMENTS

| | | | |
|---|---|---|---|
| 2008/0192116 A1* | 8/2008 | Tamir | G06T 7/2093 348/157 |
| 2009/0019367 A1* | 1/2009 | Cavagnari | G06F 21/62 715/716 |
| 2009/0300520 A1* | 12/2009 | Ashutosh | H04L 12/1831 715/756 |
| 2009/0309956 A1* | 12/2009 | Hawkins | G06K 9/00402 348/14.08 |
| 2009/0319916 A1* | 12/2009 | Gudipaty | G06Q 10/109 715/753 |
| 2010/0073454 A1* | 3/2010 | Lovhaugen | G06F 3/0486 348/14.03 |
| 2011/0193932 A1* | 8/2011 | Long | H04L 12/1827 348/14.07 |
| 2012/0150956 A1* | 6/2012 | Tucker | H04L 65/1069 709/204 |
| 2012/0287226 A1* | 11/2012 | Baloga | A47B 87/002 348/14.08 |
| 2012/0314015 A1 | 12/2012 | Watson et al. | |
| 2012/0317485 A1 | 12/2012 | Ding et al. | |
| 2013/0066623 A1 | 3/2013 | Chou et al. | |
| 2013/0191896 A1* | 7/2013 | Adderly | H04W 12/06 726/6 |
| 2013/0234933 A1* | 9/2013 | Reitan | G06F 3/011 345/156 |
| 2013/0271560 A1* | 10/2013 | Diao | H04L 12/1827 348/14.08 |
| 2014/0040368 A1* | 2/2014 | Janssens | H04L 67/306 709/204 |
| 2014/0101227 A1 | 4/2014 | Bieselt et al. | |
| 2014/0149384 A1* | 5/2014 | Krishna | G06F 17/30035 707/711 |
| 2014/0149554 A1* | 5/2014 | Krishna | G06F 17/3002 709/219 |
| 2014/0149592 A1* | 5/2014 | Krishna | G06F 1/329 709/226 |
| 2014/0184721 A1* | 7/2014 | Zhang | H04N 7/15 348/14.02 |
| 2014/0195675 A1* | 7/2014 | Silver | H04L 65/1083 709/224 |
| 2014/0347265 A1* | 11/2014 | Aimone | G09G 3/003 345/156 |
| 2015/0049162 A1* | 2/2015 | Kurupacheril | H04N 5/23238 348/14.08 |

OTHER PUBLICATIONS

Advanced Video Coding for Generic Audiovisual Services, May 2003, International Telecommunication Union.
Multi-Camera and Multi-Modal Sensor Fusion: Algorithms and Applications, Oct. 18, 2008, ECCV 2008, France.
U.S. Appl. No. 14/065,665, filed Oct. 29, 2013.

* cited by examiner

REGION ON INTEREST SELECTION

TECHNICAL FIELD

This disclosure relates in general to the field of online meetings, and more particularly, to identification of a region of interest in an online meeting.

BACKGROUND

A web hosted service may allow parties in different locations to participate in a common virtual meeting or online presentation. The web hosted service issues invitations to a list of parties that may participate in the virtual meeting or presentation. Invitations, which may be sent through email, include information for recipients to join at a designated time at which the meeting or presentation is scheduled to begin. Web hosted meeting services may include calendars or interact with other calendaring programs. The invitation email that invites a recipient to join a meeting may include information that enables the meeting to be added to a calendar of the recipient. Some hosted meetings include desktop sharing, videos of the presenter, other camera views.

Some virtual meetings include both online participants and in-person local participants that are physically located in the same area as the presenters (e.g., in a conference room or a classroom). The local participants have the freedom to simultaneously watch the presenter, a slide show or other aspects of the meeting or presentation. Online participants do not have this flexibility.

BRIEF DESCRIPTION OF THE DRAWINGS

Example embodiments of the present embodiments are described herein with reference to the following drawings.

DESCRIPTION OF EXAMPLE EMBODIMENTS

Overview

In one implementation, a method includes identifying multiple views for a presentation for one or more remote users. The multiple views include multiple regions of interest that are part of the presentation. The method includes receiving orientation data from one or more local users, and selecting, using a processor, a view including one of the plurality of regions of interest based on the orientation data. Finally, a media stream including the view is sent to the one or more remote users.

In another implementation, a method includes generating, by a motion sensor of a wearable computer, orientation data describing the orientation of the wearable computer associated with a local user, generating, at a camera of the wearable computer, a view of a first region of interest. A remote presentation includes the view of the first region of interest or a view of a second region of interest based on the orientation data.

Example Embodiments

Online presentations may be provided to users that are local to the presenter and to users that are remote from the presenter. For example, a presentation room may include people watching the presenter in person as local users. In addition, the presenter and/or other portions of the presentation may be recorded by a camera and microphone and transmitted over the Internet or another network to remote users.

In some examples, different views are available to the remote users. The views may include the presenter and a presentation (e.g., slides, whiteboard, or other materials). The behavior of the local users may be used to determine which view is provided. In one example, the orientation of the local users is measured by a wearable computer device and the current view from other sources is selected by on the orientation. In another example, the wearable computer device includes a camera that captures the current field of view of one of the local users.

Figure 1:
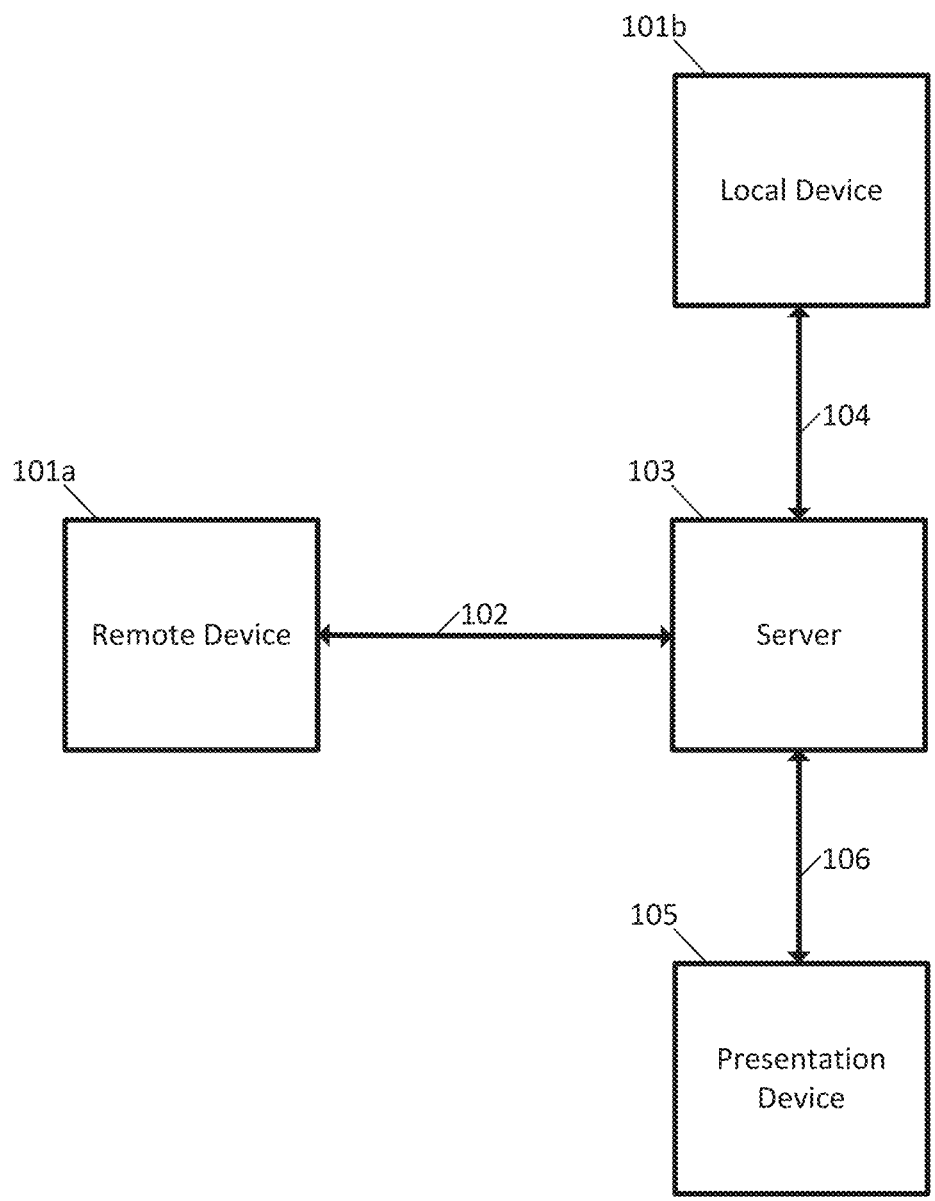
FIG. 1 illustrates an example system for the selection of a region of interest in an online meeting or presentation.

FIG. 1 illustrates an example system for the selection of a region of interest in an online meeting or presentation. The system includes a remote device 101a, a local device 101b, a presentation device 105 and a server 103. The remote device 101a is coupled to the server 103 through at least one communication path 102. The local device 101b is coupled to the server 103 through one or more communication paths 104. The presentation device 105 is coupled to the server 103 through one or more communication paths 106. Additional, different, or fewer components may be included in the system.

The presentation device 105 may be a computer that is configured to both send a presentation to a display for local users and transmit the presentation to remote users. The presentation may include a slideshow or another type of desktop sharing. The desktop sharing may include any software (e.g., word processing, spreadsheet, computer-aided-design, video clip, web browser or other applications). The presentation device 105 may be coupled to one or more cameras. A camera may capture images of a presenter. A camera may capture images of a white board, chalkboard, or other demonstration used by the presenter.

The presentation device 105 is configured to generate multiple views for a presentation for at least one local user and at least one remote user. The presentation for the at least one local user may be different than the presentation for the at least one remote user. For example, the presentation for the local users may always include the desktop sharing, and the presentation for the remote users may switch between multiple regions of interest. One of the regions of interest may be the desktop sharing portion provided to the local users. One of the regions of interest may be video of the presenter or another location in the presentation room.

The presentation device 105 may send a media stream including the presentation to the remote device 101a through the server 103. The presentation device 105 may receive orientation data from the one or more local users. The orientation data may be generated in a wearable computer or other device by a motion or position sensor. The presentation device 105 is configured to select a view from the multiple views or regions of interest based on the orientation data. The presentation device 105 sends a media stream including the view to the one or more remote users including the remote device 101*a*. In another example, the server 103 may determine the region of interest from the orientation data and select a view from the multiple views.

Example types of communication for communication paths 102, 104, and 106 may include Wi-Fi (e.g., the family of protocols known as IEEE 802.11), Ethernet (e.g., IEEE 802.3), a cellular network, Bluetooth, universal serial bus (USB), or other modes of data communication. The cellular network may include one or more of the analog advanced mobile phone system (AMPS), the global system for mobile communication (GSM), third generation partnership project (3GPP), code division multiple access (CDMA), personal handy-phone system (PHS), and 4G or long term evolution (LTE) standards.

Figure 2:
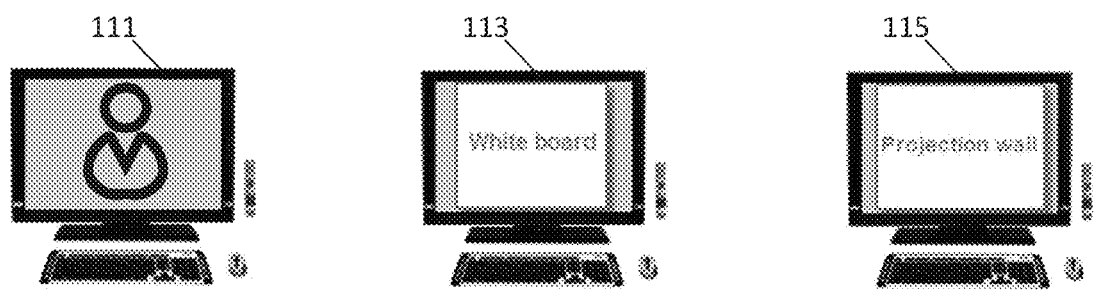
FIG. 2 illustrates example regions of interest in an online meeting or presentation.

FIG. 2 illustrates example regions of interest in an online meeting or presentation. The regions of interest are individually included in the media stream to the remote device 101*a*. Any number of regions of interest may be included. The example of FIG. 2 includes a presenter view 111, a whiteboard view 113, and a projection wall 115.

The projection wall 115 may be the desktop sharing discussed above. The projection wall 115 may be projected on a wall of the room or a screen. Alternatively, the desktop sharing may be displayed on a monitor or television (e.g., liquid crystal display, digital light processor, cathode ray tube, plasma, or another display technology). The desktop sharing may include a slide presentation or any type of software running on the presentation device 105.

The whiteboard view 113 may include video from a camera that captures an image of a whiteboard, a chalkboard, or other surface. The presenter may write or draw on the whiteboard or chalkboard, which is also captured by the camera. The presenter view 111 may include video from a camera that captures an image of the presenter. In one example, the camera is a single camera that is pivotable between the whiteboard view 113 and the presenter view 111. The camera may be mounted on a tripod and/or operated by an operator. In another example, two cameras (e.g., one camera dedicated to the whiteboard view 113 and another camera dedicated to the presenter view 111). The cameras may be stationary or pivotable.

Figure 3:
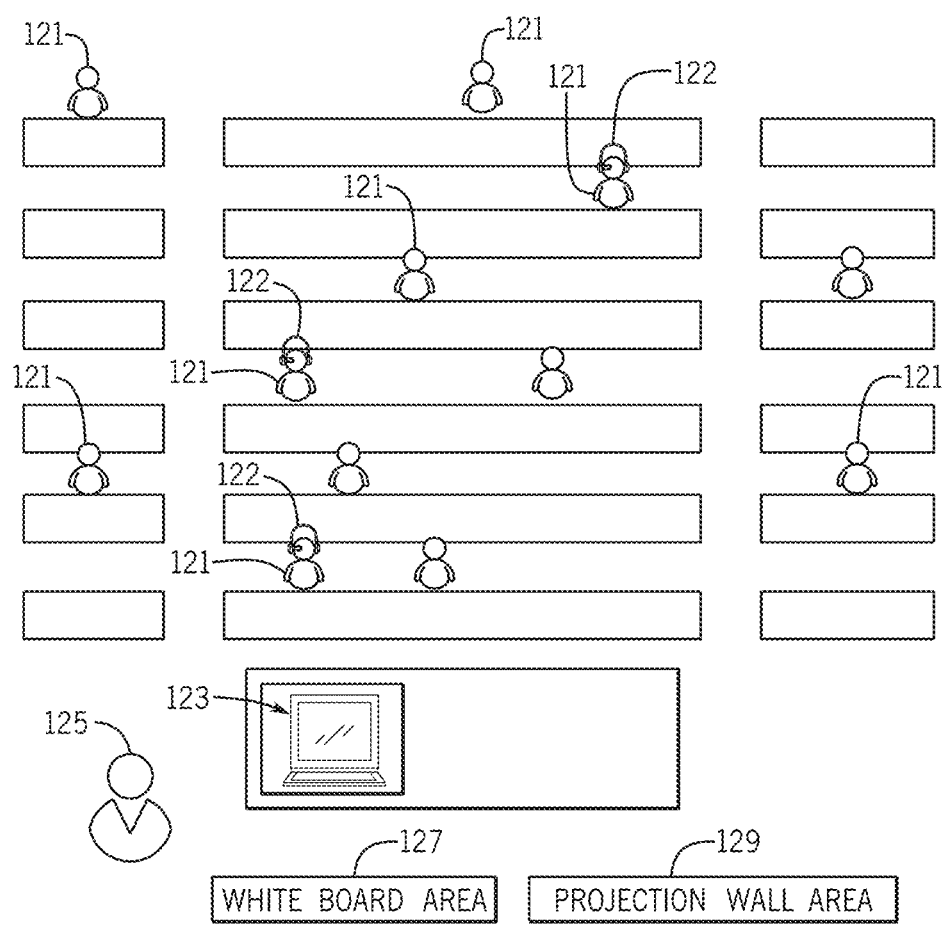
FIG. 3 illustrates an example local area for an online meeting or presentation.

FIG. 3 illustrates an example local area for an online meeting or presentation. The local area may be a room or other space including multiple local users 121, a local computer 123, a presenter 125, a whiteboard area 127, and a projection wall area 129. One, some or all of the users 121 may be wearing or otherwise associated with wearable computers 122, which are examples of local device 101*b*. The local computer 123 may correspond to the presentation device 105, the presenter 125 may correspond to the presenter view 111, the whiteboard area 127 may correspond to the whiteboard view 113, and the projection wall area 129 may correspond to the projection wall 115, all of which may be referred to as regions of interest.

The wearable computer 122 may include an optical head mounted display (OHMD). The OHMD may display images or reflect images to the user and simultaneously allow the user to see through the OHMD. Two examples that allow a surface to display images but also be partially transparent include a curved mirror and a waveguide.

Figure 4:
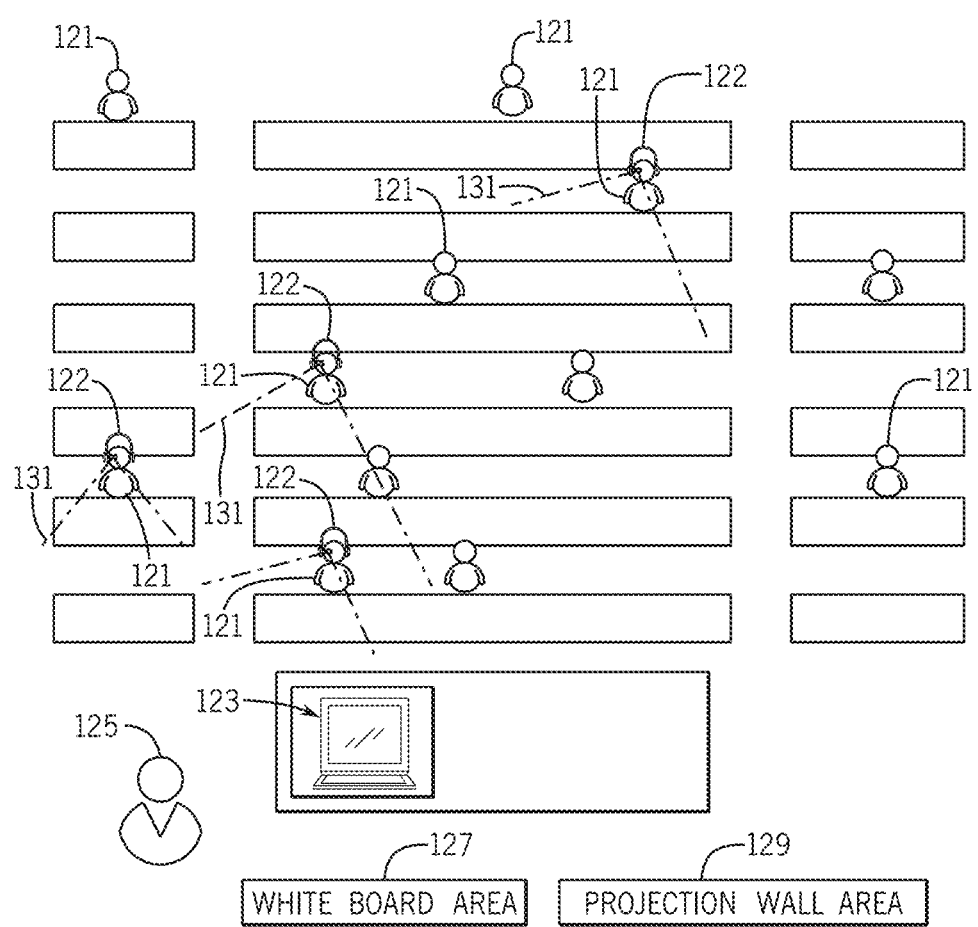
FIG. 4 illustrates another example of a local area for an online meeting or presentation including local users with wearable computers.

FIG. 4 illustrates another example of a local area for an online meeting or presentation including local users 121 with wearable computers 122. The wearable computer 122 may include an inertial measurement unit (IMU). The IMU may include motion sensors including any combination of an accelerometer, a magnetic sensor, a gyroscope. The IMU may include motion sensors for each of multiple axes (e.g., X-axis, Y-axis, and Z-axis). The wearable computer 122 may receive orientation data from the IMU and forward the orientation data to the presentation device 105 or the server 103.

The wearable computers 122 may also include a position sensor. The position sensor may process signals received from multiple orbiting satellites, such as in a Global Positioning System (GPS). The position sensor may receive data indicative of signal strength from multiple wireless access points or multiple cellular base stations. The wearable computer 122 may receive position data from the position sensor and forward the position data to the presentation device 105 or the server 103.

FIG. 4 also illustrates that each of the wearable computers 122 is associated with a field of view 131. The field of view 131 describes the line of sight of a user wearing the wearable computer 122. The field of view may be described by an angle or geographic of position of the line of sight.

The size of the field of view 131 may be constant for all users (e.g., 90 degrees, 110 degrees, 130 degrees or another value). The size of the field 131 of view may be dependent on the type of wearable computer 122. Different wearable computers may be different fields of view depending on the type of OHMD or the dimensions of the physical components of the device. The presentation device 105 or the server 103 may store a lookup table that associated types of wearable computers with fields of view.

One or more of the wearable computers 122 may send data indicative of the corresponding field of view 131 to the presentation device 105 or the server 103. Various techniques may be used to identify the dominant field of view or the region of interest in the presentation. In one example, only one field of view is received and adopted as the region of interest. In another example, multiple fields of view are received and the region of interest is derived from the average field of view or more common field of view.

The presentation device 105 or the server 103, which may be referred alternatively or collectively as the selection device, may analyze the relative positions of the wearable computers 122 and the regions of interest. In one example, the selection device selects a view or camera feed to be the media stream sent to the remote users. In another example, the selection device controls a position of the camera for capturing images of the region of interest.

The selection device may receive identifying geographic locations for the regions of interest. The locations may be entered manually when configuring the presentation room. The locations may be detected based on a camera view of the presentation room. The locations may be detected based on position circuitry of devices at the regions of interest.

The selection device may receive the position data indicative of geographic locations for one of the wearable computers 122. The selection device may determine a field of view based on the based on the orientation data and the geographic locations for one of the wearable computers 122. When the field of view intersects one of the region of interest, the selection device selects that region of interest as the selected view that is sent as a media stream to the remote users viewing the presentation or meeting.

In another example, the selection device may receive the position data indicative of geographic locations for multiple wearable computers 122. The selection device may determine a field of view based on the based on the orientation data and the geographic locations for the multiple wearable computers 122. The selection device may perform a comparison of the field of view for multiple wearable computers 122 with respect to the geographic locations for the regions of interest.

In one implementation, the selection device may identify a view position from the center of the field of view for each of the wearable computers 122. The view position may be at an intersection of a line that extends from each of the wearable computers 122 and terminates at one of the regions of interest. The selection may determine how many of the view positions intersect each of the regions of interest. The selection device may select region of interest having the most view positions as the view that is sent as a media stream to the remote users viewing the presentation or meeting.

In one implementation, the selection device may average the field of view for some or all of the wearable computers 122. The average field of view may define an average view position that is an intersection of a line that extends from the average field of view to one of the regions of interest. The selection device selects that region of interest as the view that is sent as a media stream to the remote users viewing the presentation or meeting.

In an alternative, the selection device may perform another statistical analysis on the fields of views of the wearable computers 122. For example, the selection device may determine a median field of view for the wearable computers 122. The median field of view may be the middle field of view when the fields are view are organized in sequence (e.g., from left to right across the possible regions of interest). The fields of view may be organized into intervals and the middle interval or most likely interval is selected.

As an alternative to selecting a view, the selection device may control an actuator that moves the camera. The actuator may include a stepping motor with a position that corresponds to each of the possible regions of interest. In response to the orientation data, fields of view, or positions of the wearable computers 122, the selection device generates a command for the actuator to move the selected region of interest into the view of the camera. In other words, the selection device determines the viewing angle of a particular wearable computer, or the most common viewable angle of a group of wearable computers, and moves a camera to capture images at that viewable angle.

Figure 5:
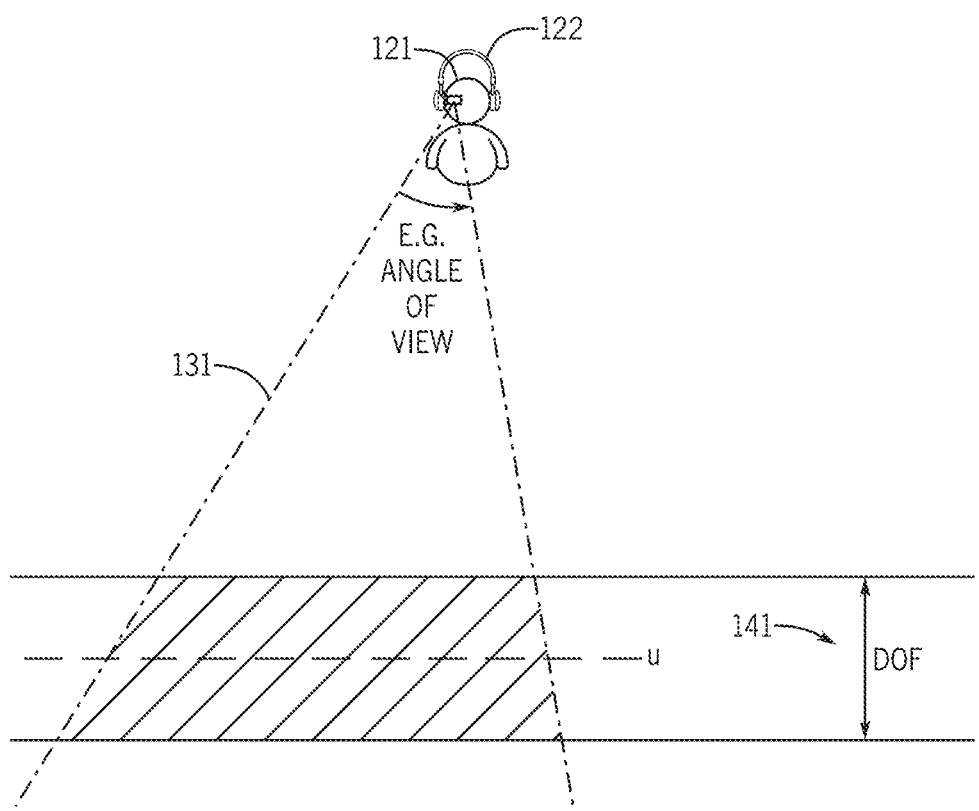
FIG. 5 illustrates an example user with a wearable computer.

FIG. 5 illustrates another example local area example user 121 with a wearable computer 122. The field of view 131 defined by an angle of view extends away from the user 121 to a depth of field 141. The depth of field 141 defines a viewable range between the farthest the camera of the wearable computer 122 could capture focused images and the closest the camera of the wearable computer 122 could capture focused images.

The cameras for the wearable computers 122 are associated with a focal distance (f) and an image distance (v). From the focal distance and the image distance, the center of the field of view, or object distance (u) may be calculated according to Equation 1.

$$\frac{1}{f} = \frac{1}{v} + \frac{1}{u} \qquad \text{Eq. 1}$$

The focal distance and the image distance may be stored for each camera or for each type of wearable computer 122 by the selection device. The focal distance and the image distance may be a function of a focal setting of the camera or another mode selection of the camera. The corresponding object distance may be calculated based on the focal distance and image distance combination from the focal setting.

The object distance defines the field of view. The lens of the camera focuses only on a single distance at a time. Any deviation from that distance introduces a decrease in sharpness. The field of view describes the minimum and maximum distances around the object distance that introduces only a threshold amount of decrease in sharpness. The distances may be defined between a deep focus and a shallow focus. The distances may be a predetermined percentage of the focal length (e.g., 5%, 10% or another value) or a predetermined absolute difference (e.g., 5 feet, 1 meter, 10 feet, or another distance).

Figure 6:
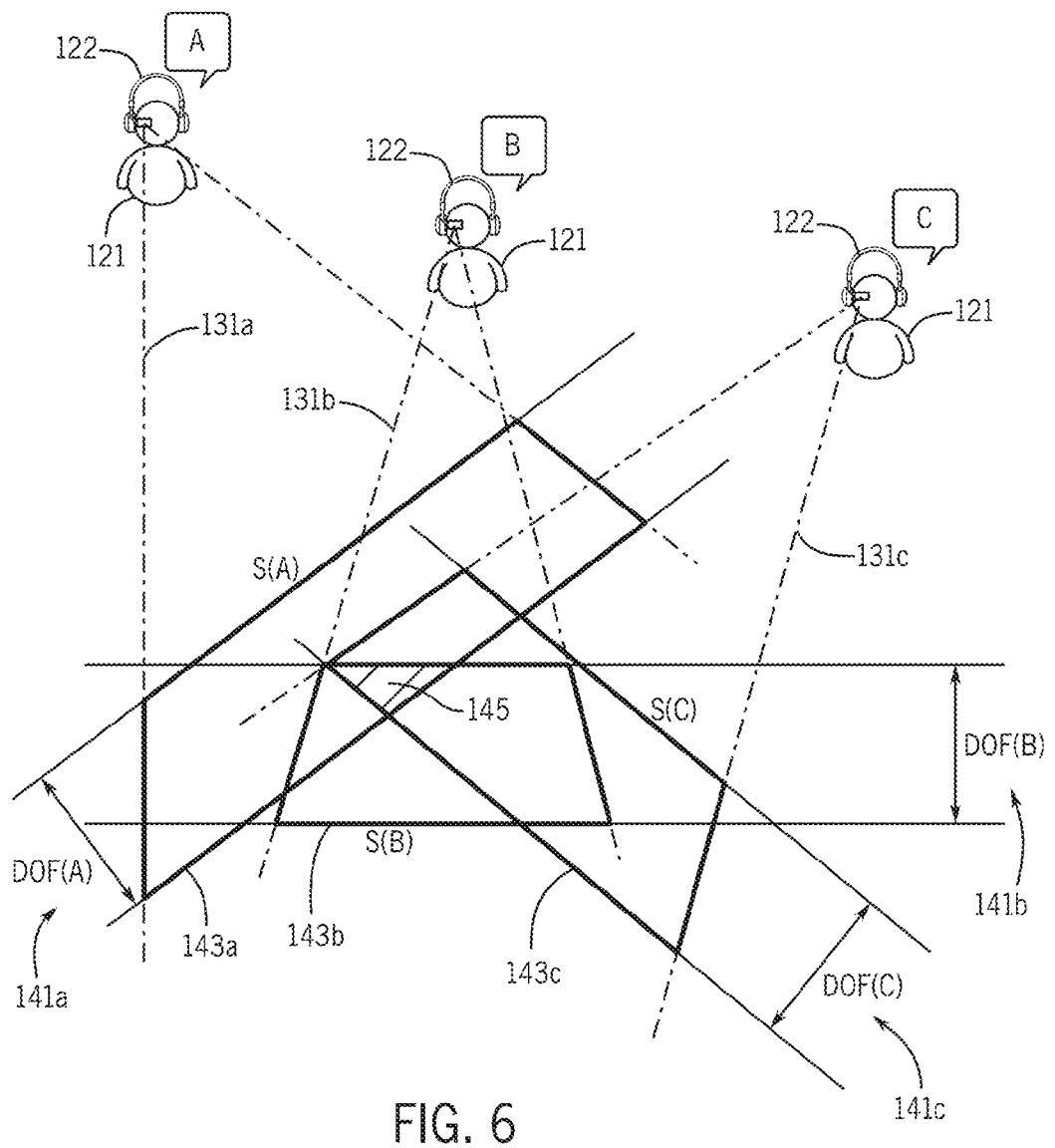
FIG. 6 illustrates an example set of users with overlapping fields of view.

FIG. 6 illustrates an example set of users 121 with wearable computers 122 having overlapping fields of view. The camera for user A is associated with a depth of field 141a and a field of view 131a defining a quadrilateral 143a for a visible region S(A). The camera for user B is associated with a depth of field 141b and a field of view 131b defining a quadrilateral 143b for a visible region S(B). The camera for user C is associated with a depth of field 141c and a field of view 131c defining a quadrilateral 143c for a visible region S(C).

The selection device may receive depth of field data from the multiple wearable computers 122. The depth of field data may be determined according to the decrease of focus thresholds and object distances described above. The selection device may calculate boundaries for the quadrilaterals 143a-c in a two-dimensional space. In other words, the selection device determines a geographic region that corresponds to each of the wearable computers 122. Geometrically, an overlap region 145 may be identified by the selection device where the geographic regions (quadrilaterals 143a-c) intersect.

The selection device may compare the potential views obtainable from the wearable computers 122 by analyzing the overlap region 145. The overlap has an area (S). The selection device may calculating a first fraction of the overlap region 145 to the quadrilateral 143a:

$$\frac{S}{S(A)}.$$

The selection device may calculate a second fraction of the overlap region 145 to the quadrilateral 143b:

$$\frac{S}{S(B)}.$$

The selection device may calculate a third fraction of the overlap region 145 to the quadrilateral 143c:

$$\frac{S}{S(C)}.$$

Alternatively, the fractions may be the quadrilaterals over the overlap region 145:

$$\frac{S(A)}{S}, \frac{S(B)}{S}, \frac{S(C)}{S}.$$

The selection device is configured to compare the fractions. With the overlap region in the numerator $$\left(\text{e.g., } \frac{S}{S(A)}, \frac{S}{S(B)}, \frac{S}{S(C)}\right),$$

the selection device identifies the highest fraction as the selected view that is sent in the media stream to the remote users. With the overlap region in the denominator $$\left(\text{e.g., } \frac{S(A)}{S}, \frac{S(B)}{S}, \frac{S(C)}{S}\right),$$

the selection device identifies the lowest fraction as the selected view that is sent in the media stream to the remote users.

Figure 7:
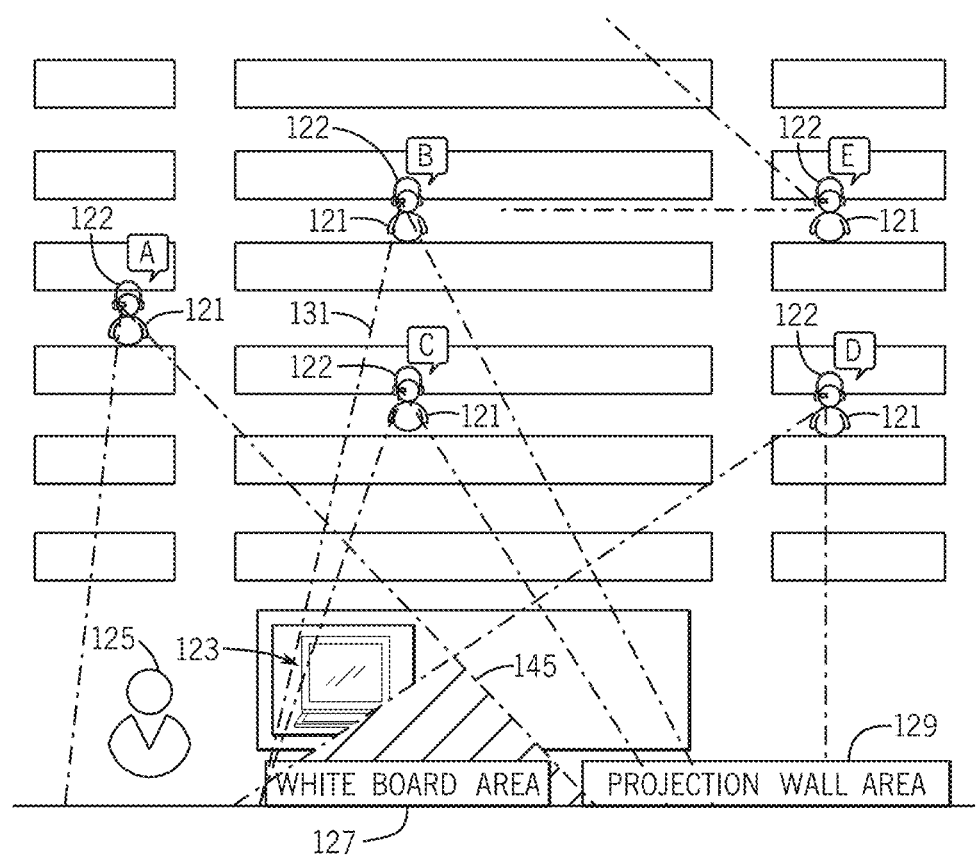
FIG. 7 illustrates a set of users in a local area.

FIG. 7 illustrates another example of a set of users 121 in a local area. Using a technique similar to that discussed with respect to FIG. 6, an overlap region 145 is calculated based on the fields of view 131 and the depths of view for wearable computers associated with the set of users 121. The overlap region 145 is matched with a potential region of interest (e.g., presenter 125, a white board area 127, or a projection area 129).

In one example the selection device may select a camera of one of the wearable computers that is capturing an image of the overlap region 145. The closest wearable computer (e.g., user C may be selected) based on the relative geographic positions of the users 121. In another example, the wearable computer that is perpendicular to the selected region of interest may be selected. The media stream from the camera of the selected wearable computer is sent to remote users.

In another example, camera feeds are available to the selection device for each of the presenter 125, the white board area 127, the projection area 129. The selection device selects a camera feed to be sent to the remote devices based on the overlap region 145.

Figure 8:
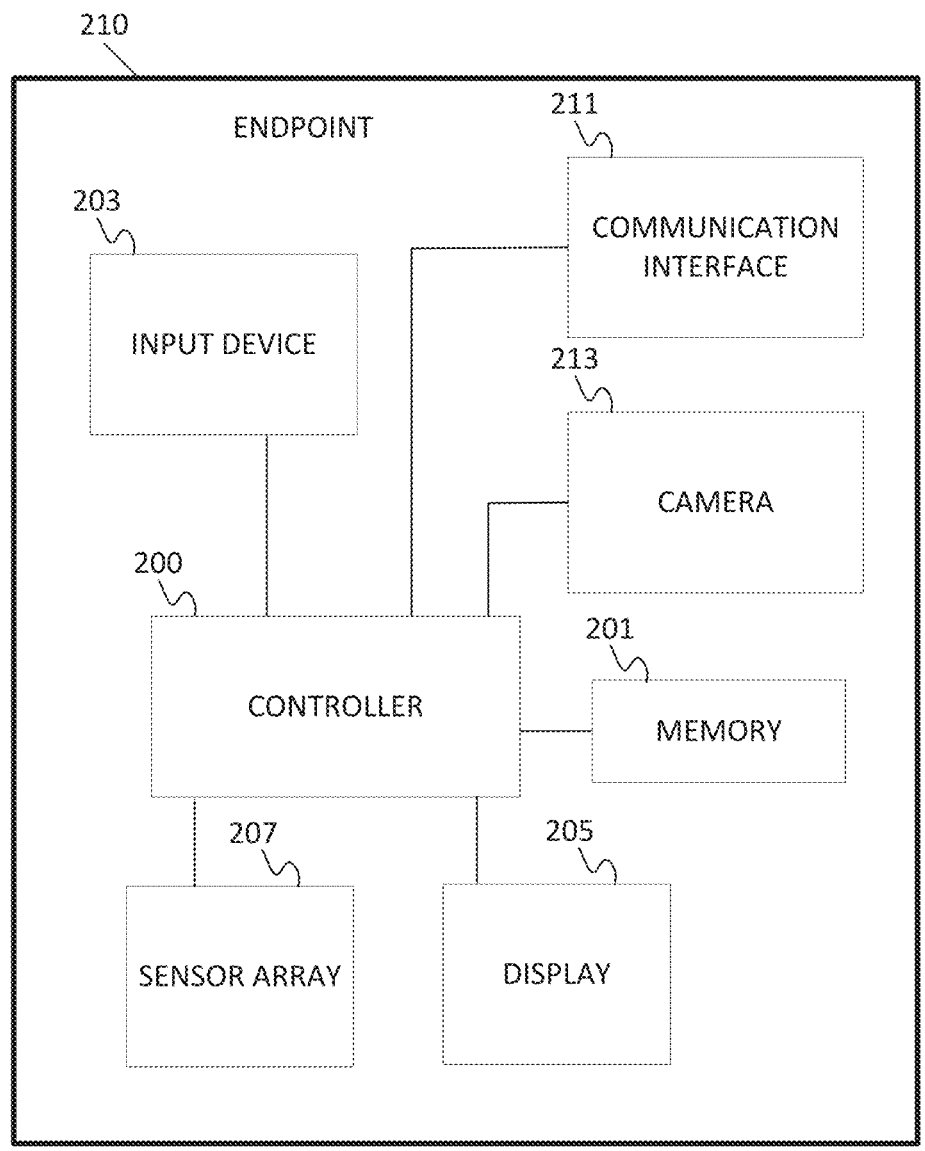
FIG. 8 illustrate an example endpoint.
Figure 9:
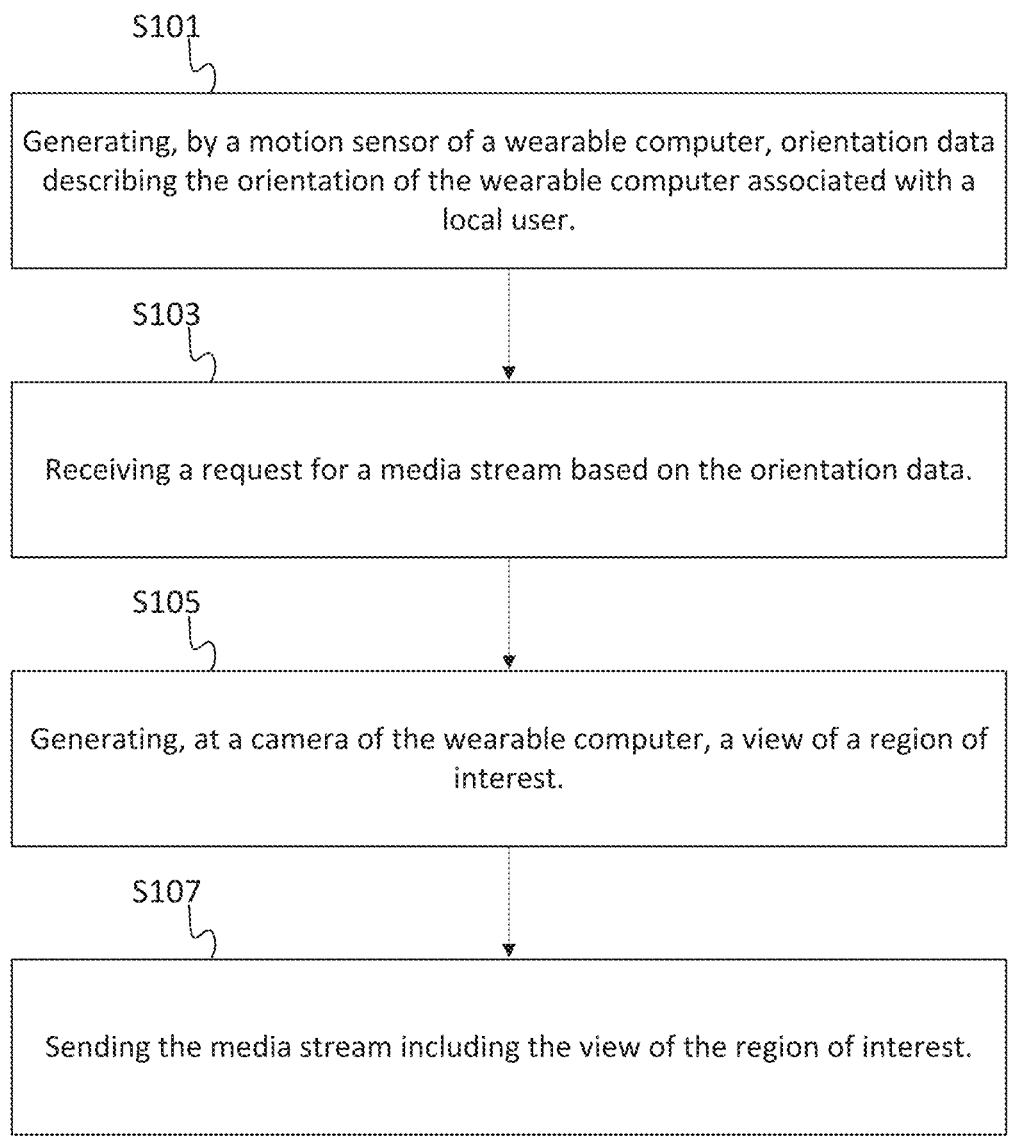
FIG. 9 illustrates an example flowchart for the operation of the endpoint of FIG. 8.

FIG. 8 illustrates an example endpoint device 210 (e.g., local endpoint 101*b* or wearable computer 122) for the systems of FIG. 1-7. The endpoint device 101 includes a controller 200, a memory 201, an input device 203, a communication interface 211, a camera 213, a sensor array 207 and a display 205. FIG. 9 illustrates an example flowchart for the selection of a region of interest in a meeting or presentation using the endpoint 210. Additional, different, or fewer acts may be provided. The acts are performed in the order shown or other orders. The acts may also be repeated.

At act S101, the sensor array 207 generates orientation data describing the orientation of the wearable computer associated with a local user. The sensor array 207 may include a position sensor for generating position data and a motion sensor for generating orientation data. The motion sensor may include any combination of accelerometers, magnetometers, and gyroscopes. The position sensor may include a Global Positioning System (GPS), Global Navigation Satellite System (GLONASS), or a cellular or similar position sensor for providing location data. For example, the position may be derived from signal strength from WiFi or cellular access points.

At act S103, the controller 200 or communication interface 211 receives a request for a media stream based on the orientation data. The request may be generated from a selection device (e.g., presentation device 105). The selection device may choose between multiple wearable computers based on orientation data received from multiple wearable computers.

At act S105, the camera 213 generates a view of a region of interest. The region of interest is the area being viewed by the user of the wearable computer. In some examples, the camera 213 collects image data continuously. In some examples, the camera 213 collects image data in response to the request from the selection device.

At act S107, the communication interface 211 sends the media stream including the view of the region of interest to the selection device. The media stream may be encoded using in a variety of formats or multiple formats. The formats may vary in size, resolution, number of colors, frame rate, definition type, or another property of the video. Example sizes may be measured in the diagonal size of the display (e.g., 3 inches, 10 centimeters). Example resolutions may be expressed in the number of pixels (e.g., 1, 5, 10, 50 megapixels) or by the number of lines in each direction (480×720, 1024×968, or another value). Example numbers of color include 1 color, 16 colors, 256 colors, 50,000 colors or 16.7 million colors. Example definition types include standard definition, high definition, or another type of definition.

Example protocols for multiple formats include scalable video coding (SVC) or high efficiency video coding (HEVC). SVC may be implemented according to the standard Annex G extension of Version 9 of the H.264/MPEG-4 AVC video compression standard implemented in February 2014 and available at http://www.itu.int/ITU-T/recommendations/rec.aspx?rec=6312.

The input device 203 may receive user inputs for the focal length or object distance of the camera 213. The input device 203 may receive inputs for the position of the wearable computer 122 or the distances to the potential regions of interest. The display 205 may present textual or graphical illustrations of the current field of view of the wearable computer 122 and the locations of the regions of interest.

The input device 203 may be one or more buttons, keypad, keyboard, mouse, stylus pen, trackball, rocker switch, touch pad, voice recognition circuit, or other device or component for inputting data to the mobile device 101. The input device 203 and the display 205 may be combined as a touch screen, which may be capacitive or resistive. The display 205 may be a liquid crystal display (LCD) panel, light emitting diode (LED) screen, thin film transistor screen, or another type of display.

Figure 10:
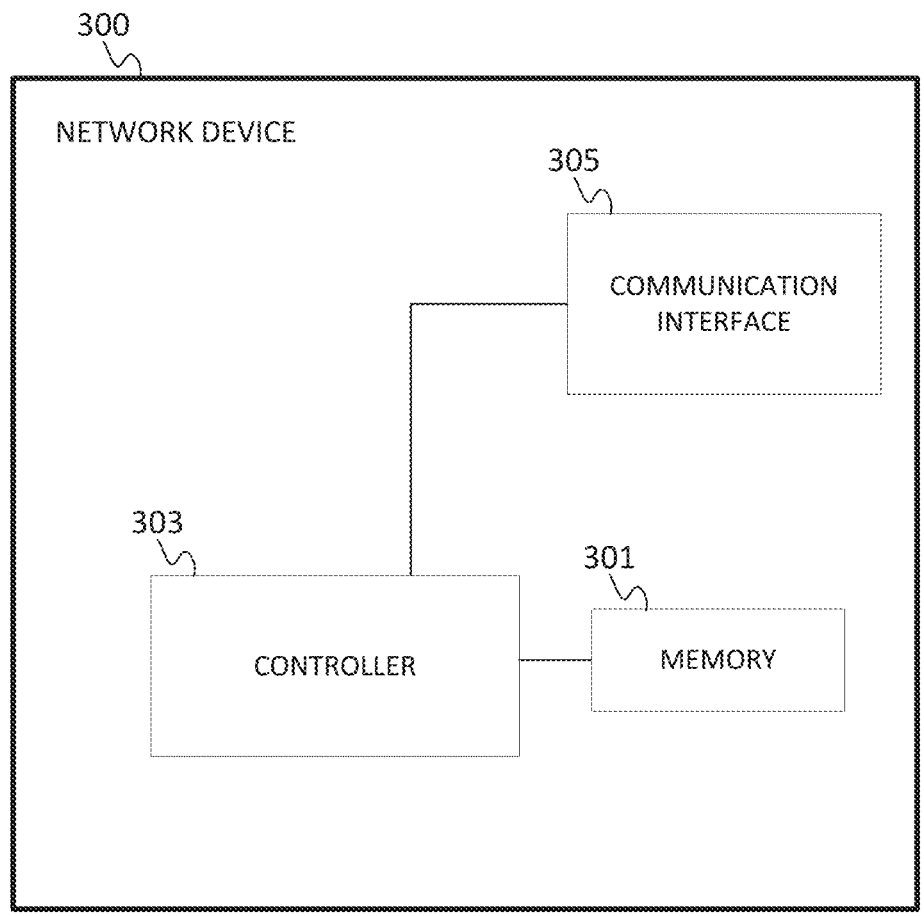
FIG. 10 illustrates an example network device.
Figure 11:
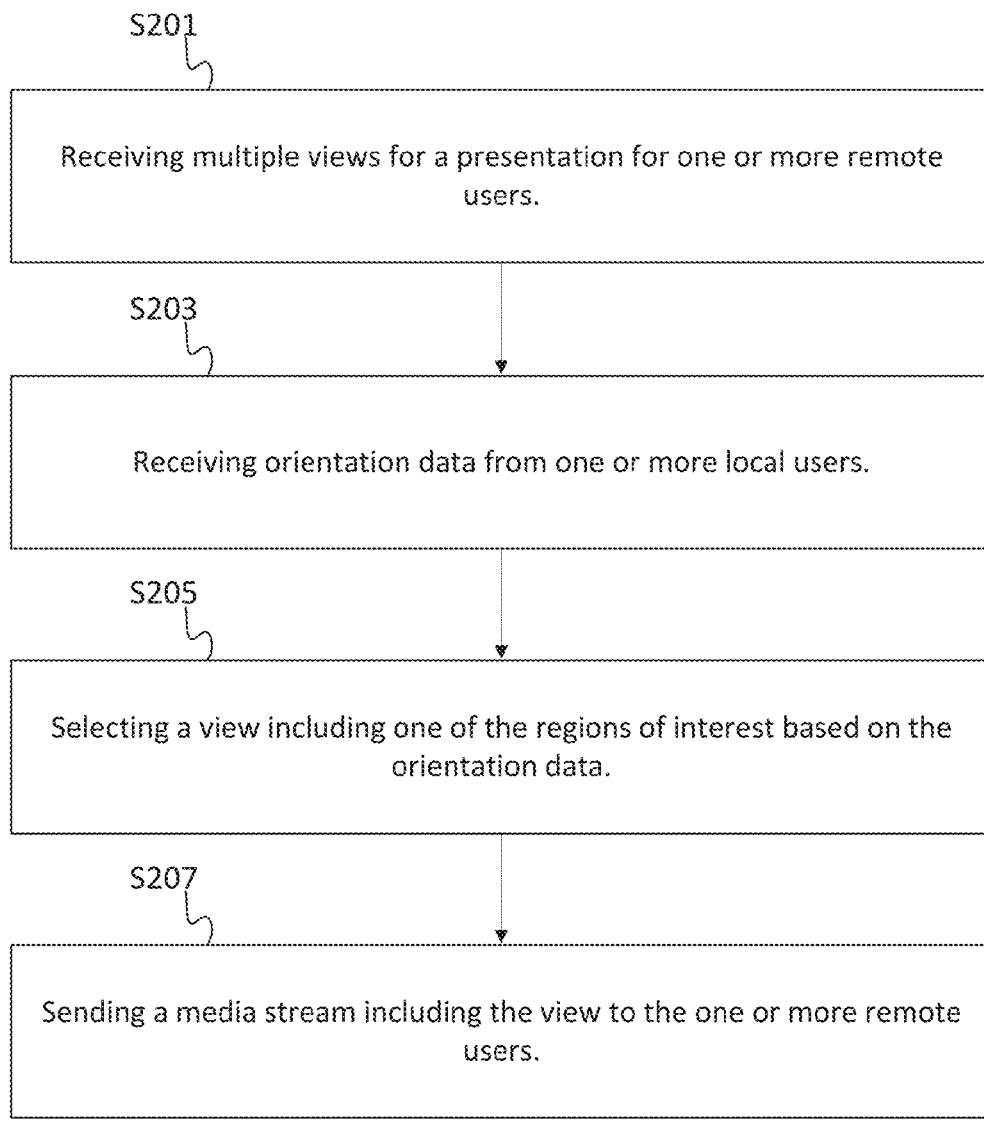
FIG. 11 illustrates an example flowchart for operation of the network device of FIG. 10.

FIG. 10 illustrates an example network device 300 for the systems of FIG. 1-7. The network device 300 may correspond to the server 103 or the presentation device 105. The network device 300 includes at least a memory 301, a controller 303, and a communication interface 305. Additional, different, or fewer components may be provided. Different network devices may have the same or different arrangement of components. FIG. 11 illustrates an example flowchart for selecting a region of interest in a presentation or meeting using the network device 300 of FIG. 10 (e.g., server 103). Additional, different, or fewer acts may be provided. The acts are performed in the order shown or other orders. The acts may also be repeated.

At act S201, the communication interface 305 includes multiple input interfaces to receive multiple views for a presentation for one or more remote users. The multiple views include various regions of interest in the presentation. The regions of interest may include a projection wall upon which a prepared presentation is displayed, a whiteboard or chalkboard upon with supplemental material for the presentation is added, and a speaker who is making the presentation. The multiple views may be generated by one or more wearable computers 122 or standalone cameras. The multiple views may be generated by a combination of a stand-alone camera and one or more wearable computers 122.

At act S203, the controller 303 or the communication interface 305 receives orientation data from one or more local users. The orientation data, as described above, indicates the viewing angle for one or more wearable computers 122. Thus, the orientation data indicates where users local to the presentation are gazing.

At act S205, the controller 303 select a view including one of the multiple regions of interest based on the orientation data. The selected view may be the view that the most wearable computers 122 is pointed at. The selected view may be determined based on overlapping regions of multiple wearable computers 122. The selected view may be based on a single wearable computer. At act S207, the controller 303 or the communication interface 305 sending a media stream including the view to the one or more remote users. The view may be captured by a camera of the closest wearable computer 122 or any wearable computer with sufficient resources (e.g., bandwidth).

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    identifying multiple views for a presentation for one or more remote users, wherein the multiple views include a plurality of regions of interest;
    receiving line of sight data from a wearable computer worn by one or more local users;
    selecting, using a processor, a view including one of the plurality of regions of interest based on the line of sight data; and
    sending a media stream including the view to the one or more remote users.

2. The method of claim 1, wherein the wearable computer includes a camera configured to capture the view.

3. The method of claim 1, wherein the wearable computer includes an optical head mounted display.

4. The method of claim 1, wherein the plurality of regions of interest includes a presenter, a whiteboard, and a slide presentation.

5. The method of claim 1, wherein each of the plurality of regions of interest corresponds to an angle range.

6. A method comprising:
    identifying multiple views for a presentation for one or more remote users, wherein the multiple views include a plurality of regions of interest;
    receiving orientation data from one or more local users;
    selecting, using a processor, a view including one of the plurality of regions of interest based on the orientation data;
    sending a media stream including the view to the one or more remote users;
    wherein the one or more local users includes a plurality of users associated with wearable computers, the method comprising:
    receiving depth of field data from the plurality of users; and
    identifying an overlap of the depth of field data from the plurality of users,
    wherein the view is selected based on the overlap.

7. The method of claim 6, wherein identifying the overlap comprising:
    determining a first geographic area corresponding to a first wearable computer; and
    determining a second geographic area corresponding to a second wearable computer; and
    calculating the overlap between the first geographic area and the second geographic area.

8. The method of claim 7, further comprising:
calculating a first fraction of the first geographic area to the overlap;
calculating a second fraction of the second geographic area to the overlap; and
comparing the first fraction to the second fraction;
wherein the view corresponds to a camera view of the first wearable computer when the first fraction is greater than the second fraction and corresponds to a camera view of the second wearable computer when the second fraction is greater than the first fraction.

9. A method comprising:
identifying multiple views for a presentation for one or more remote users, wherein the multiple views include a plurality of regions of interest;
receiving orientation data from one or more local users;
selecting, using a processor, a view including one of the plurality of regions of interest based on the orientation data;
sending a media stream including the view to the one or more remote users;
wherein the one or more local users includes a plurality of users associated with wearable computers, the method comprising:
identifying geographic locations for the plurality of regions of interest;
identifying geographic locations for the plurality of wearable computers;
determining a field of view based on the orientation data and the geographic locations for the plurality of wearable computers; and
performing a comparison of the field of view for each of the plurality of wearable computers with respect to the geographic locations for the plurality of regions of interest;
wherein the view is selected based on the comparison.

10. The method of claim 9, wherein the comparison averages the field of view for the plurality of wearable computers.

11. The method of claim 9, wherein the comparison selects a median field of view for the plurality of wearable computers.

12. An apparatus comprising:
a communication interface configured to receive data for multiple views for a presentation for one or more remote users, wherein the multiple views include a plurality of regions of interest; and
a controller configured to select a view for one or more remote users based on orientation data from one or more local users, the view including one of the plurality of regions of interest, wherein the orientation data is a line of sight for a wearable computer of the one or more local users.

13. The apparatus of claim 12, wherein the communication interface is configured to send a media stream including the view to the one or more remote users.

14. The apparatus of claim 12, wherein the wearable computer includes a camera configured to capture the view.

15. The apparatus of claim 12, wherein the view is selected based on a field of view of the wearable computer.

16. The apparatus of claim 12, wherein the multiple views include a camera feed for one portion of the presentation and a desktop sharing feed for a second portion of the presentation.

17. The apparatus of claim 12, wherein the controller is configured to receive depth of field data and identify an overlap of the depth of field data, wherein the view is based on the overlap.

18. An apparatus comprising:
a motion sensor configured to generate orientation data describing a viewing angle of a wearable computer associated with a local user; and
a camera configured to generate a view of a first region of interest;
wherein the view of the first region of interest or a view of a second region of interest is selected for a presentation to a remote user based on the viewing angle of the wearable computer associated with the local user.

19. The apparatus of claim 18, further comprising:
a controller configured to receive depth of field data and identify an overlap of the depth of field data, wherein the view is based on the overlap.

* * * * *

UNITED STATES PATENT AND TRADEMARK OFFICE
CERTIFICATE OF CORRECTION

PATENT NO. : 9,628,529 B2  
APPLICATION NO. : 14/461976  
DATED : April 18, 2017  
INVENTOR(S) : Huang et al.

Page 1 of 1

It is certified that error appears in the above-identified patent and that said Letters Patent is hereby corrected as shown below:

On the Title Page

Item (54), Title, replace "REGION ON INTEREST SELECTION" with --REGION OF INTEREST SELECTION--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*